United States Patent [19]

Thalmann

[11] Patent Number: 4,697,831
[45] Date of Patent: Oct. 6, 1987

[54] PREFABRICATED ASSEMBLY FOR HIGH TENSILE STRENGTH PIPE CONNECTIONS

[75] Inventor: Alfred Thalmann, Uhwiesen, Switzerland

[73] Assignee: Georg Fischer Aktiengesellschaft, Switzerland

[21] Appl. No.: 867,763

[22] Filed: May 28, 1986

[30] Foreign Application Priority Data

Jun. 6, 1985 [CH] Switzerland ............... 2395/85

[51] Int. Cl.[4] .................................. F16L 33/22
[52] U.S. Cl. ........................ 285/174; 285/242; 285/158
[58] Field of Search ............... 285/258, 174, 242

[56] References Cited

U.S. PATENT DOCUMENTS

| 867,108 | 9/1907 | Carmer | 285/258 |
|---|---|---|---|
| 2,517,606 | 8/1950 | Spender | 285/258 |
| 3,127,672 | 4/1964 | Kretschmer | 285/258 X |
| 4,295,668 | 10/1981 | Louthan et al. | 285/174 X |
| 4,524,997 | 6/1985 | Ebert | 285/258 X |
| 4,530,520 | 7/1985 | Nyffeler et al. | 285/21 |

FOREIGN PATENT DOCUMENTS 575377  7/1924  France ..................... 285/258

Primary Examiner—Thomas F. Callaghan
Attorney, Agent, or Firm—Toren, McGeady & Associates

[57] ABSTRACT

A prefabricated assembly for forming a high tensile strength pipe connection is formed by providing a metallic muff and pressing one end of a pipe adapter made from plastic material into the muff. The metallic muff has an internal diameter formed with sawtooth projections which penetrate the material of the pipe adapter and the penetration is enhanced by inserting a smooth support sleeve into the pipe adapter, the support sleeve being stiffer than the pipe adapter and operating to effect a positive and frictionally locking connection. The opposite end of the pipe adapter may then be attached by welding or the like with a plastic material pipe to form thereby a tight connection at a utilization site.

5 Claims, 1 Drawing Figure

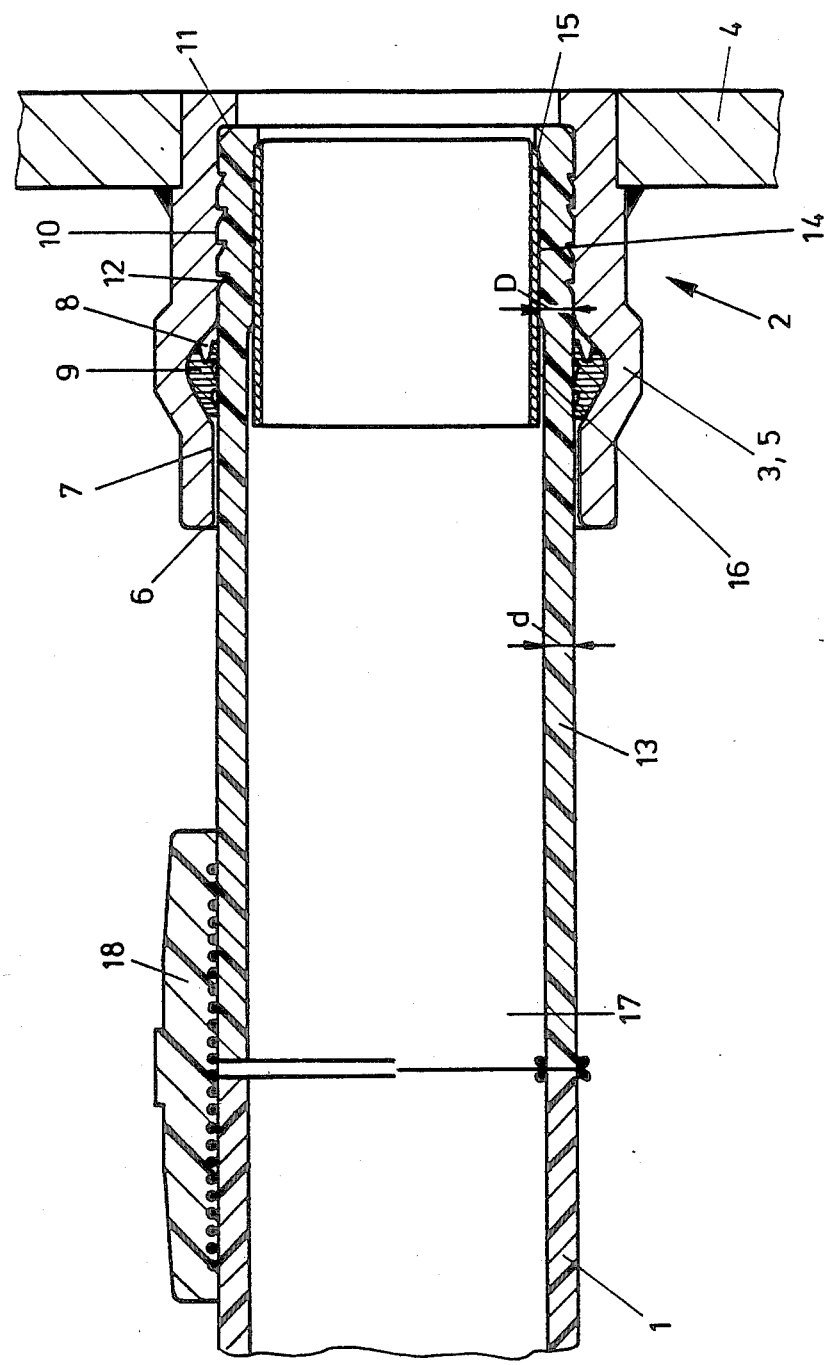

PREFABRICATED ASSEMBLY FOR HIGH TENSILE STRENGTH PIPE CONNECTIONS

The present invention is directed to a prefabricated pipe connection assembly and to a process for fabrication of a connection of a plastic material pipe with a metallic connecting part, said connection having high tensile strength for sealing a medium contained therein.

Pipe connections between plastic material pipes and metallic connecting parts or pipes have a high tensile strength and are known, for example, from No. DE-C-2,911,708 and No. DE-U-7,931,114.

In these pipe connections, a high tensile strength connection is achieved by considerable deformation of the plastic material pipe, whereby this occurs either by widening of the inner support sleeve or pressing of the plastic material pipe into annular grooves of the metallic connecting part (see No. DE-U-7,931,114). Alternatively, by sliding of an outer sleeve onto the plastic material pipe, the deformation may be made to occur in annular grooves of an inserted metallic connecting part (see No. DE-C-2,911,708). A connection sealed with a medium moderately tight sealing effect is thus achieved simultaneously with deformation of the plastic pipe.

It has, however, been shown that in the case of such pipe connections, particularly with larger diameters used in gas pipelines, a long-lasting tight seal cannot be assured because of creep of the plastic material and decay of stresses. In the course of the deformation of the plastic material, particularly during the widening of the pipe by means of the inner sleeve (see (No. DE-U-7,931,114), fairly large stress fields are generated at the transition to the unwidened pipe portion. As a result, in the case of additional load caused by an inside compression and tension, the fatigue strength and tight seal of the connection cannot be assured. Direct connection of the plastic pipe with a metal pipe or a connecting part rigidly arranged at a fitting is not feasible because of the required inner expansion tool. Connections at the utilization site are also very difficult to fabricate because of the required tools.

SUMMARY OF THE INVENTION

The present invention is directed toward provision of a process for fabrication of a pipe connection of the previously mentioned type which assures even in the case of larger pipe dimensions a permanently tight seal for the medium to be carried, whereby a connection of the plastic pipe material with metallic fittings is possible without additional detachable parts.

Briefly, the present invention may be described as a prefabricated assembly for forming a high tensile strength connection between a plastic material pipe and a metallic connecting piece and a process therefor, the process comprising the steps of providing a metallic muff equipped with an elastic seal and having an inside diameter with projections extending therefrom, pressing one end of a pipe adapter made from plastic material into the metallic muff, pressing into the inside diameter of the pipe adapter a smooth support sleeve which is stiffer with respect to the pipe adapter in order thereby to expand the diameter of the pipe adapter at the area where it is connected with the metallic muff to effect penetration into the pipe adapter material of the projections on the metallic muff to form therebetween a positive and frictionally locked connection and connecting an end of the pipe adapter opposite to said one end thereof with the plastic material pipe by means of a tight connection to thereby effect connection of the prefabricated unit composed of the pipe adapter and the metallic muff at a utilization site.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

DESCRIPTION OF THE DRAWING

FIG. 1 is a cross-sectional view of a pipe connection assembly in accordance with the present invention.

DETAILED DESCRIPTION OF THE PREFERRED EMBODIMENT

Referring now to the drawing, the pipe connection assembly in accordance with the invention is shown in longitudinal section as comprising a plastic material pipe 1 with a metallic connecting part 2, with a muff member 3 designed as a welding muff 5 being welded on a valve or a fixture 4. The muff member 3 can be equipped at the opposite end also with a connection thread constituting a threaded muff or it can be equipped with a metallic welding adapter so that it may be welded directly to the pipe. Alternatively, it can be equipped with a flange whereby it may be attached by means of a flange connection to a valve, fitting, mounting or metal pipe.

The muff member 3 has a cylindrical guidance portion 7 beginning at an insertion side 6, an annular groove 8 for arrangement of a seal 9—preferably, a lip seal—and a seating portion 10 with an annular front face 11 acting as a longitudinal stop.

The seating portion 10 has at its inner circumference annular projections 12, which have a sawtooth cross-sectional configuration.

A pipe adapter 13 consisting of plastic material is arranged in the muff member 3 and is connected in a frictionally and positively locking manner in the area of the seating portion 10 with the muff member 3 by pressing in or digging in of the sawtooth rings 12.

The pipe adapter 13 has at its insertion end a centering seat 14 for a support sleeve 16 which is stiffer than the pipe adapter 13. The wall thickness D of the pipe adapter is somewhat larger in the area of the centering seat 14 than the remaining thickness d which corresponds to that of the plastic material pipe 1 to be connected.

The support sleeve 16 is longer than the centering seat 14 and reaches up to the area of the outer end of the seal 9, whereby the length of the centering seat 14 corresponds approximatey to the length of the seating portion 10 of the muff member 3. The external diameter of the pipe adapter 13 is larger than the inside diameter defined by the tips of the sawtooth rings 12, but it is as large or slightly smaller than the inside diameter of the seating portion 10. The external diameter of the support sleeve 16 is larger than the inside diameter of the centering seat 14 of the pipe adapter 13, but smaller than the remaining inside diameter of the pipe adapter.

The free end 17 of the pipe adapter 13 may be connected with the plastic material pipe by a continuous connection of the same material as, for instance, a welding connection, using a welding sleeve 18 (as shown in the top portion of FIG. 1) by butt welding (as shown in the bottom portion of FIG. 1), or by means of a bonded connection. The connection is sealed tight with respect to the medium contained in the pipe, is of high tensile strength and is nondetachable.

In the performance of the assembly process of the invention, to start off with, the seal 9 is installed into the annular groove 8. Then the pipe adapter 13 is pressed into the seating portion 10 of the muff member 3 up to the front face 11 by means of a pressure ram, whereby the constricting deformation of the pipe adapter 13 occurs by the sawtooth projections 12 which penetrate partially into the external surface of the pipe adapter 13. By forcing the support sleeve 16 fabricated, preferably from stainless steel, starting with the free end 17 up to a stop 15 or up to a stop at the pressing-in tool, the pipe adapter 13 is expanded in the area of the seating portion 10, so that the sawtooth annular projections 12 penetrate further from the outside into the pipe adapter wall, whereby a frictional and positive lock of the connection between the pipe adapter 13 and the muff member 3 is achieved.

These working steps can advantageously be performed in the shop, where appropriate and auxiliary means, such as presses, are available. At the utilization site, there then occurs the permanent connection of the pipe adapter with the already laid pipeline 1 by means of the connection by welding or bonding, depending on the plastic material used in the previously described manner. In this way, there is constituted an overall nondetachable high tensile strength and permanently sealed connection of the plastic material pipe with a metallic connecting part.

Since, in the area of the frictionally and positively locking connection, the stress effects of the medium pressure are absorbed in this area by the structure of the metallic muff member, the pipe adapter is stressed in this area only by the generated compressive stresses of the frictional lock and by the tensile forces generated by the inside pressure and the external influences. Apart from that, the strength in this area is increased by the slightly greater wall thickness.

The inventive pipe connection is preferably used in gas pipelines made from polyethylene. It can also be used in pipelines from polypropylene.

Thus, it will be seen that, in accordance with the invention, the pipe adapter 13 from plastic material is pressed into a metallic muff member 3 in order to form a frictional and positively locking connection constituted by the sawtooth annular projections 12, which is reinforced by a support sleeve 16 pressed into the inside diameter of the pipe adapter 13, in that the wall of the pipe adapter 13 is clamped in between the metallic inside respective external surfaces and thus the sawtooth projections supply a solid anchoring. The seal 9 on the insertion side of the muff member 3 assures the tightness of the connection. At the utilization site, this connection is then connected between the pipe adapter 13 and the metallic connecting piece by means of a sleeve or butt welding connection with a plastic material pipe 1 in such a manner that it is medium tight, has high tensile strength and is undetachable.

While a specific embodiment of the invention has been shown and described in detail to illustrate the application of the inventive principles, it will be understood that the invention may be embodied otherwise without departing from such principles.

What is claimed is:

1. A prefabricated assembly for forming a high tensile strength connection between a plastic material pipe and a metallic connecting piece comprising:

a metallic muff equipped with an elastic seal and having an inside diameter with projections extending therefrom;

a plastic pipe adapter having a pressed-in portion at a first end thereof pressed into said metallic muff, said pipe adapter including a second end opposite said first end, said pressed-in portion having an enlarged wall thickness;

said metallic muff being formed with an inner wall having a concave annular recess therein wherein said elastic seal is maintained pressed about the exterior of said pipe adapter;

a smooth support sleeve engaging at said pressed-in portion pressed into said inside diameter of said pipe adapter which is stiffer with respect to said pipe adapter in order thereby to expand the diameter of said pipe adapter at the area where it is connected with said metallic muff to effect penetration into said pipe adapter of said projections on said metallic muff to form therebetween a positive and frictionally locking connection, said pipe adapter and said muff forming a prefabricated unit, said pressed-in portion having an intial underformed inside diameter which is smaller than an external diameter of said support sleeve; and connection means forming a tight connection between said second end of said pipe adapter and said plastic material pipe for effecting connection of said prefabricated unit at a utilization site.

2. An assembly according to claim 1, wherein said projections are annularly shaped and have a sawtooth cross section.

3. An assembly according to claim 1, wherein said pipe adapter has an external diameter which is greater than an inside diameter defined by the tips of said projections.

4. An assembly according to claim 3, wherein said external diameter of said pipe adapter is equal to or slightly smaller than a cylindrical inside diameter arranged between said projections.

5. An assembly according to claim 1, wherein said support sleeve consists of stainless steel and is arranged to be tightly seated along a partial length thereof in said pipe adapter.

* * * * *